March 17, 1970    F. M. SCOTT    3,501,226
CORRECTIVE COSMETIC MIRROR
Filed Feb. 3, 1967
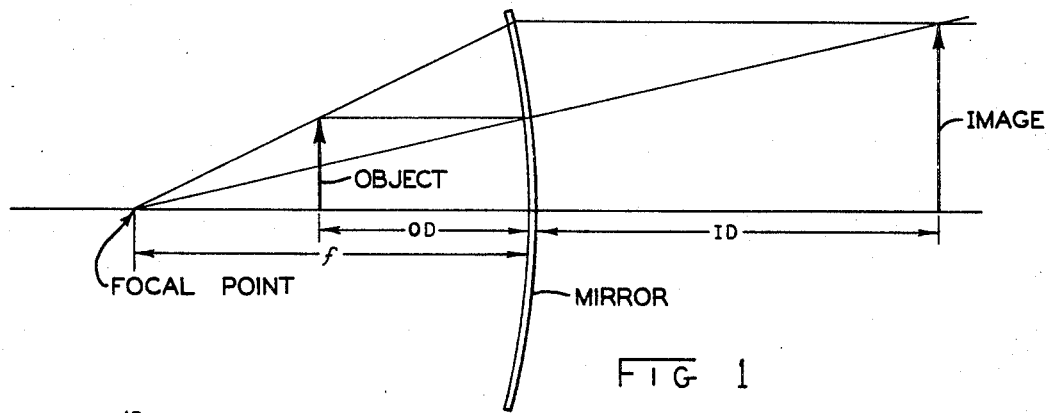
FIG 1
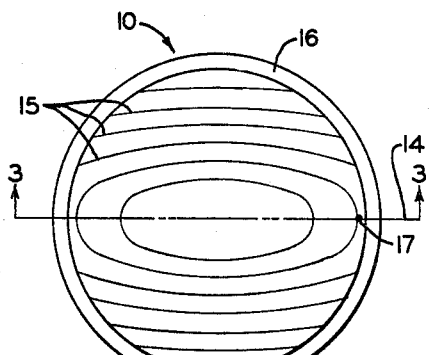
FIG 2
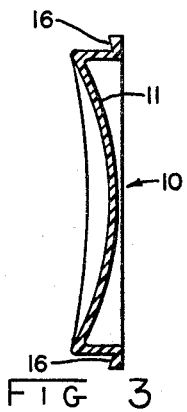
FIG 3
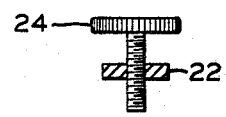
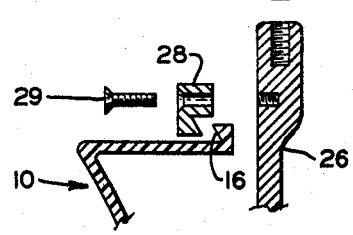
FIG 5
FIG 4
INVENTOR
FLORENCE M. SCOTT
BY Jeffers & Young
ATTORNEYS United States Patent Office 3,501,226
Patented Mar. 17, 1970

3,501,226
CORRECTIVE COSMETIC MIRROR
Florence M. Scott, 5910 Radcliffe Drive,
Fort Wayne, Ind. 46806
Filed Feb. 3, 1967, Ser. No. 613,925
Int. Cl. G02b 5/10
U.S. Cl. 350—293
1 Claim

ABSTRACT OF THE DISCLOSURE

A cosmetic mirror is provided with a concave spherical surface to accommodate for a user's hyperopia or myopia, and with an additional concave cylindrical surface along an axis that can be oriented to correct for a user's astigmatism.

BACKGROUND OF THE INVENTION

My invention relates to a face or cosmetic mirror, and particularly to such a mirror that accommodates for a user's hyperopia or myopia, and that corrects for a user's astigmatism.

Face or cosmetic mirrors of the concave, magnifying type have been used to permit a person to look at a magnified image of himself. But where the person has hyperopia (farsightedness) or myopia (nearsightedness) the mirror may not provide the desired degree of magnification at the desired image distance. Hence, the person does not see a clear image of himself. This is particularly true of people over 40 years old, as a large proportion of such people have hyperopia. In addition, many people have a defect known as astigmatism, a condition which prevents the eye from focusing at a single focal point. Persons having astigmatism may or may not also have hyperopia or myopia.

Accordingly, an object of my invention is to provide a face mirror that provides an image of the desired magnification and at the desired distance to accommodate a user, especially a user with hyperopia or myopia.

Another object of my inveniton is to provide an improved face or cosmetic mirror which helps a used compensate for hyperopia or myopia and any astigmatism he may have.

Another object of my invention is to provide a face or cosmetic mirror having a corrective concave sperical surface to correct for a user's hyperopia or myopia, or having a corrective concave cylindrical surface along an axis to correct for a user's astigmatism, or having both a corrective concave spherical surface and a corrective concave cylindrical surface.

Another object of my invention is to provide a face or cosmetic mirror of the concave type which corrects for a person's nearsightedness, farsightedness, or astigmatism, or a combination of nearsightedness and astigmatism or farsightedness and astigmatism.

SUMMARY OF THE INVENTION

Briefly, these and other objects are achieved in accordance with my invention by a mirror having a concave spherical surface of a particular focal length, and/or having a concave cylindrical surface of a particularly focal length and oriented along an axis. The concave spherical surface permits a person using the mirror to correct his hyperopia or myopia defects, and the concave cylindrical surface permits a person to rotate the mirror to adjust or compensate for his astigmatic defects. The mirror may be mounted on a stand or a handle which permits the mirror to be held with the cylindrical axis at the proper orientation for a particular user.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIGURE 1 is a diagrammatic view showing how a mirror may be used to correct for hyperopia in accordance with my invention;

FIGURE 2 shows a plan view of a preferred embodiment of a corrective mirror in accordance with my invention;

FIGURE 3 shows a cross-sectional view of the mirror of FIGURE 1, taken along the lines 3—3 in FIGURE 2;

FIGURE 4 shows a front elevation view of a stand for supporting a mirror in accordance with my invention; and FIGURE 5 shows an exploded view of parts of the stand of FIGURE 4.

DESCRIPTION OF THE PREFERRED EMBODIMENT

FIGURE 1 shows diagrammatically how a concave spherical mirror can correct for hyperopia in accordance with my invention. In FIGURE 1, the object (usually a person's face) is represented by an arrow spaced at the object distance OD in front of the mirror, and the image the person sees is represented by an arrow spaced at the image distance ID behind the mirror. The mirror has a focal point located a distance $f$ in front of the mirror. When the object distance OD is less than the focal length $f$, the image is virtual. As is known, the following relations exist for such a mirror:

$$\frac{1}{OD} + \frac{1}{ID} = \frac{1}{f} \quad (1)$$

$$\text{Magnification} = \frac{ID}{OD} \quad (2)$$

As an illustration of how my invention can aid a person with hyperopia, assume that the person's accommodation is such that he can not focus his eyes on objects any closer than 100 cm., and that he wants a magnification of 2. Under these assumptions $$OD + ID = 100 \quad (3)$$

and $$\frac{ID}{OD} = 2$$

or $$ID = 2 \cdot OD \quad (4)$$

If Equation 4 is substituted in Equation 3, and the substitution is solved, OD=33.3 cm. and ID=2·OD=66.6 cm. If an OD of 33.3 cm. and an ID of −66.6 cm. (negative since the image is virtual) are substituted in Equation 1, $f$=66.6 cm. FIGURE 1 shows this relation drawn to scale with the known geometrical construction for locating an image for a concave spherical mirror. It will be seen that the image is twice the size of the object, and that the image distance ID is equal to the focal length $f$ and is twice the object distance OD. As is known, the radius of curvature of the mirror is twice the focal length $f$, and in the assumed example would be 133.3 cm. With such a mirror, the person in the example could hold the mirror 33.3 cm. from his face and would see an image twice as large, 100 cm. from his eye. Such a mirror can be made of any suitable material such as glass or a thermo-setting plastic. One preferred plastic is Lucite ® made by E. I. du Pont de Nemours & Co. Its reflective surface may be on the front or back, depending upon the material and manufacturing technique used.

The above assumption is by way of example only, as persons skilled in the art can calculate mirror dimensions for any person's desired magnification and accommodation. My invention recognizes the use of such mirror for such persons so as to provide such persons with a face or cosmetic mirror that eliminates the necessity for wearing glasses which correct for hyperopia or myopia, and that provides magnification. Such a mirror can be made precisely to meet a person's needs, or can be made in predetermined focal lengths, one of which will be fairly suitable for most persons.

Where a person has astigmatism as well as hyperopia or myopia, my invention provides a mirror that can correct for the astigmatism and hyperopia or myopia. FIGURES 2 and 3 show plan and cross-sectional views of such a corrective mirror 10 in accordance with my invention. The mirror 10 may be made of any suitable material such as glass or a thermo-setting plastic, as explained previously. As shown in FIGURE 2, the mirror 10 preferably has a circular shape, and as shown in FIGURE 3, the mirror 10 has a reflective portion 11 which may be on the front or back surface of the mirror 10. The mirror 10 and its reflective portion 11 have a concave spherical surface, and further have a concave cylindrical surface such combination of surfaces are frequently referred to as spherocylindrical or toric surfaces. The axis of the concave cylindrical surface is indicated by the dashed and dotted line 14 in FIGURE 2. FIGURE 2 also shows contour lines 15 that assist in visualizing the concave spherical and concave cylindrical surface in the mirror 10. The mirror 10 is provided with a lip or flange 16 around its periphery, and is further provided with an index or marking point 17 which lies along the axis 14 near the outer edge of the mirror 10. As explained in connection with FIGURE 1, such a mirror, when provided with a suitable reflective material, provides clearly focused image of a person's face or other object, such focusing being corrective of a person's hyperopia or myopia. Persons skilled in the art will also appreciate that rotation of the mirror can be rotated about its center until the axis 14 corrects for a person's astigmatism.

It is possible to have a number of different focal lengths and concave cylindrical radii. However, I have found that only selected focal lengths and radii for the concave cylindrical surface need be provided. Thus, I have found that a selected range or radii of cylindrical concave surfaces can provide astigmatic correction for most users. For example, spherical focal lengths and cylindrical astigmatic corrections of one, two, three, four and five diopters will be sufficient for most users. However, it is to be understood that the invention is not limited to any particular spherical focal length or radii of cylindrical spherical surfaces.

FIGURE 4 shows a stand for holding a mirror 10 of my invention. The stand comprises a base 21 on which a suitable yoke 22 is mounted. Diametrically opposite points of the yoke 22 are provided with thumb screws 24 which support a backing plate 26. The backing plate 26 is preferably circular, since the mirror 10 is also circular. The mirror 10 is clamped against the backing plate 26 by a bezel or ring 28 which is shaped to fit over and hold the rim or flange 16 of the mirror against the backing plate 26. The bezel or ring 28 may be attached to the backing plate by a plurality of machine screws 29 which pass through the ring 28 and thread into the backing plate 26. FIGURE 5 is an exploded detailed view showing how the backing plate 26 is supported on the yoke 22 by the thumb screws 24, and showing how the bezel or ring 28 is shaped to clamp the rim or flange 16 of the mirror 10 against the backing plate 26.

In a preferred embodiment, the bezel or ring 28 is provided with angular marks at any suitable increment, such as every 22½ degrees as shown in FIGURE 4. These marks facilitate orienting the axis 14 of the mirror 10 by means of the index mark 17. If a person knows his astigmatic axis, it is possible to rotate the mirror 10 until the index mark 17 is at the proper angular point indicated on the bezel or ring 28. Or a person may simply rotate the mirror 10 to provide the clearest image without needing to know his astigmatic axis. With the mirror 10 so oriented, a person using the mirror 10 can do so and have his astigmatic defects corrected to the degree provided by the radius of the cylindrical concave surface.

It will thus be seen that my invention provides a new and improved cosmetic or face mirror which not only permits people having hyperopia or myopia to correct for these visual defects, but also permits people having astigmatism to correct for the astigmatic defect. And, manufacturers will appreciate that a relatively small number of mirrors, as for example, five such mirrors in one diopter steps, can provide astigmatic correction for many users. Or, a person may have such a mirror made to correct precisely for his hyperopia or myopia, and/or astigmatism.

Persons skilled in the art will appreciate that modifications may be made to my invention. For example, the mirror 10 may be made from a number of materials, and may be provided with various types of reflecting surfaces and materials. The stand may take a number of embodiments, and may be a hand-held type rather than the shelf stand shown in FIGURE 4, which rests on an object. Various yokes and mounting arrangements may also be provided, and it is not necessary that the ring completely surround the mirror as shown in FIGURE 4, or that the ring be provided with angular markings as shown in FIGURE 4. Therefore, while my invention has been described with reference to a particular embodiment, it is to be understood that modifications may be made without departing from the spirit of my invention or from the scope of the claim.

What I claim as new and desire to secure by Letters Patent of the United States is:

1. A corrective cosmetic mirror comprising a circular mirror mount having means for orienting and steadying it, said mount having an angular indicia on the front side of the cosmetic mirror, a circular reflective surface element on said front side having a circular periphery with an index mark thereon and being rotatably adjustably positioned in the mount, means for securing said circular reflective surface element at selective orientation in the mount, said reflective surface being a focusing mirror of toric curvature for providing astigmatic defect focusing and to provide visual defect focusing for one of myopia and hyperopia and said reflective surface having a focal length to provide a predetermined magnification and distance between the object and the image to compensate for visual defects of the user.

References Cited

UNITED STATES PATENTS

| | | | |
|---|---|---|---|
| 840,084 | 1/1907 | Muller | 350—295 |
| 1,513,734 | 1/1924 | Beatty | 350—296 |
| 1,536,828 | 11/1921 | Dresher | 350—191 |
| 1,972,019 | 11/1930 | Kanolt | 350—293 |
| 1,944,406 | 1/1934 | Crofton | 350—296 XR |

FOREIGN PATENTS 880,999  11/1961  Great Britain.

DAVID SCHONBERG, Primary Examiner

A. M. OSTRAGER, Assistant Examiner